United States Patent
Urech

(10) Patent No.: US 6,639,176 B1
(45) Date of Patent: Oct. 28, 2003

(54) METHOD AND DEVICE FOR PRODUCING WELDED BLANKS

(75) Inventor: Werner Urech, Kaiserstuhl (CH)

(73) Assignee: Elpatronic AG, Bergdietikon (CH)

( * ) Notice: Subject to any disclaimer, the term of this patent is extended or adjusted under 35 U.S.C. 154(b) by 0 days.

(21) Appl. No.: 09/831,799

(22) PCT Filed: Sep. 14, 1999

(86) PCT No.: PCT/CH99/00435

§ 371 (c)(1),
(2), (4) Date: May 14, 2001

(87) PCT Pub. No.: WO00/29168

PCT Pub. Date: May 25, 2000

(30) Foreign Application Priority Data

Nov. 19, 1998 (CH) .............................. 2279/98

(51) Int. Cl.[7] ................. B23K 26/00; B23K 26/04; B23K 26/14
(52) U.S. Cl. .............. 219/121.63; 219/121.6; 219/121.67; 219/121.68
(58) Field of Search ............ 219/121.6–121.68, 219/121.74, 121.77, 121.85

(56) References Cited

U.S. PATENT DOCUMENTS

| | | | |
|---|---|---|---|
| 3,968,558 A | * 7/1976 | Sekine et al. ............... 29/429 |
| 4,190,760 A | * 2/1980 | Kano et al. ................. 219/123 |
| 4,501,949 A | * 2/1985 | Antol et al. ............ 219/121.63 |
| 4,694,139 A | * 9/1987 | Roder .................... 219/121.67 |
| 4,991,707 A | 2/1991 | Alexander et al. |
| 5,187,346 A | * 2/1993 | Bilge et al. ............ 219/121.64 |
| 5,395,205 A | 3/1995 | Dugas et al. |
| 5,662,264 A | * 9/1997 | Gustafsson et al. ....... 219/78.16 |
| 6,137,860 A | * 10/2000 | Ellegood et al. ............. 228/104 |
| 6,213,849 B1 | * 4/2001 | Johnson et al. .............. 238/170 |

FOREIGN PATENT DOCUMENTS

| | | |
|---|---|---|
| DE | 39 12 036 C1 | 7/1990 |
| EP | 0 743 129 A2 | 11/1996 |
| FR | 2 308 458 | 11/1976 |
| JP | 03-193285 A * | 8/1991 |
| JP | P31144392 B2 * | 2/1995 |

* cited by examiner

Primary Examiner—Tom Dunn
Assistant Examiner—L. Edmondson
(74) Attorney, Agent, or Firm—McCormick, Paulding & Huber LLP

(57) ABSTRACT

For the manufacture of composite panels (16) it is proposed that they be held essentially upright by means of holding devices (17) and that welding by means of a laser welding plant (11, 13) be performed in this position. This affords a considerable space saving compared with the conventional horizontal arrangement in which the composite panels are processed and handled.

19 Claims, 5 Drawing Sheets

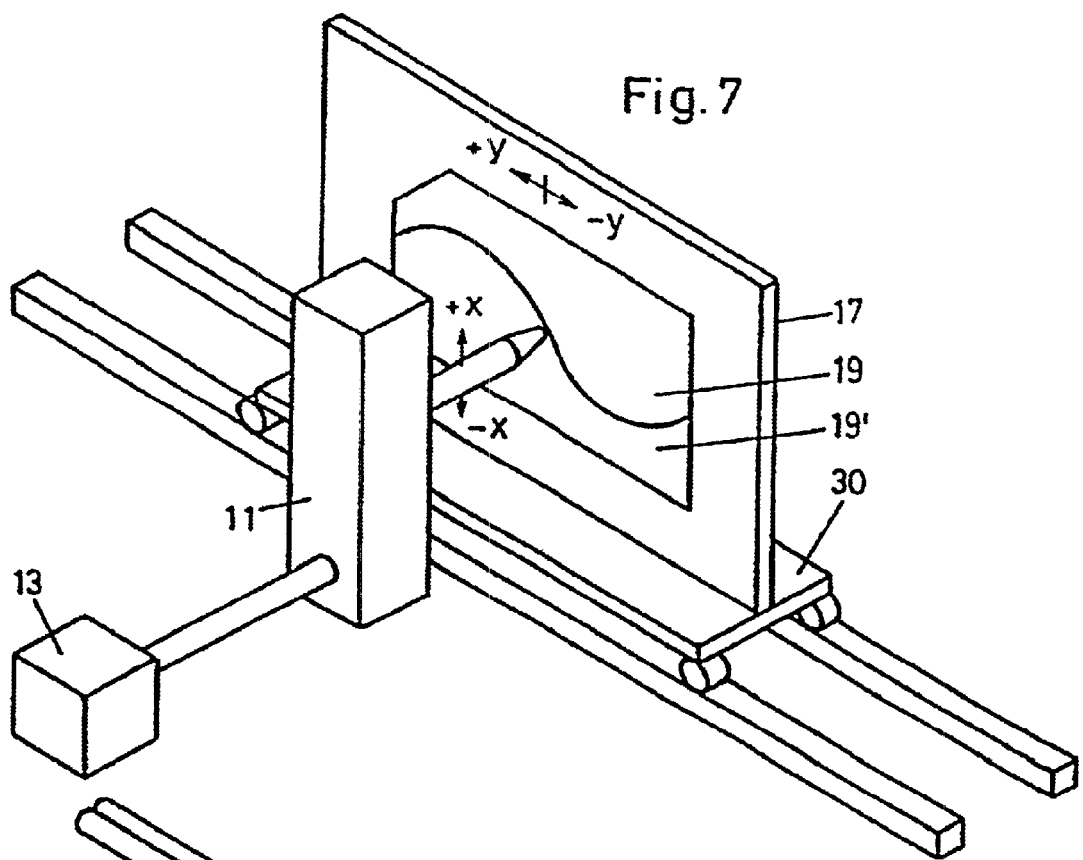
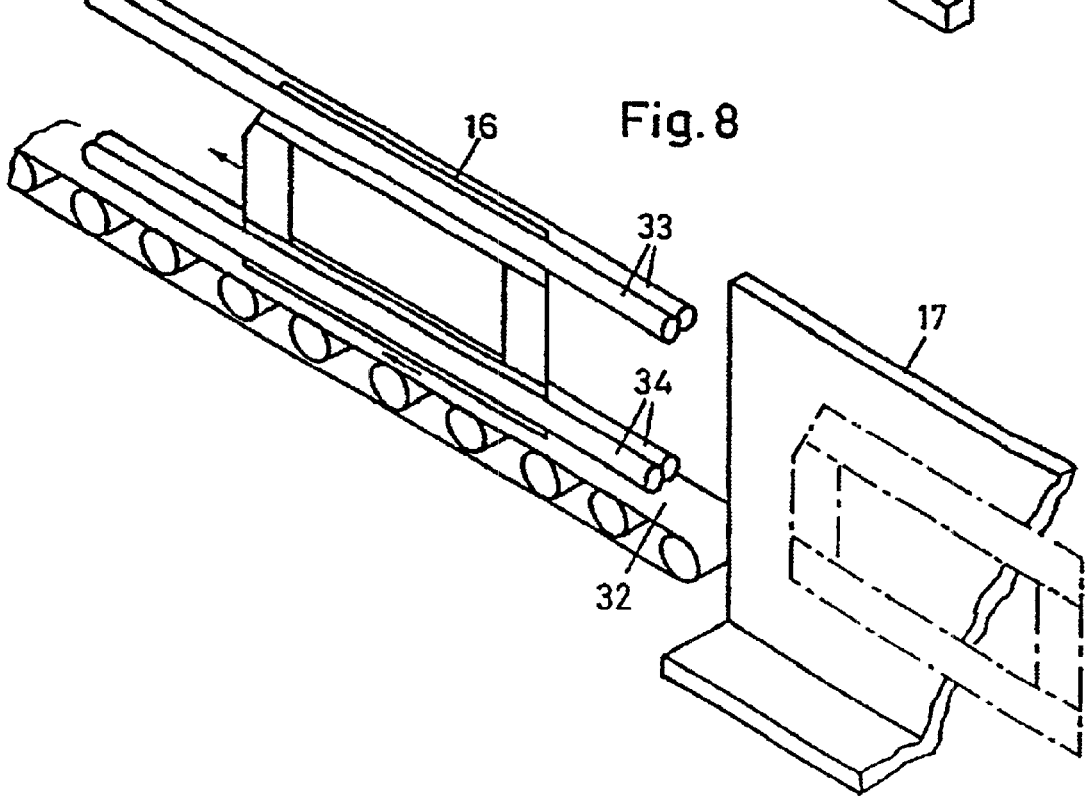

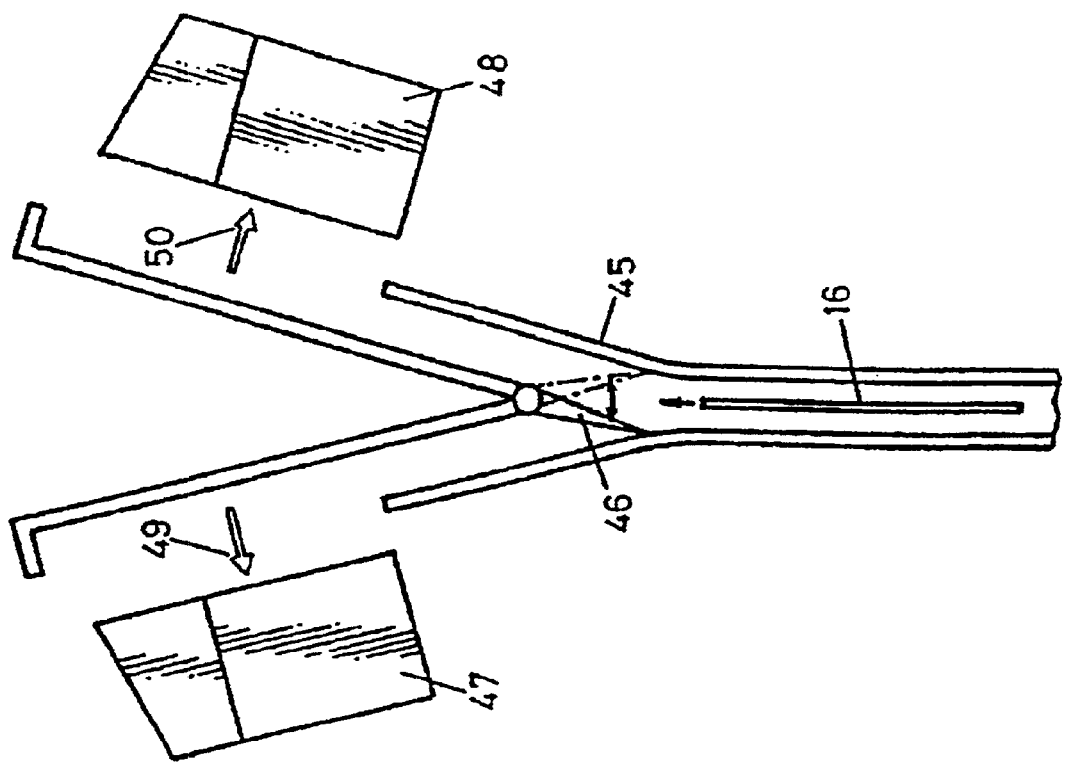
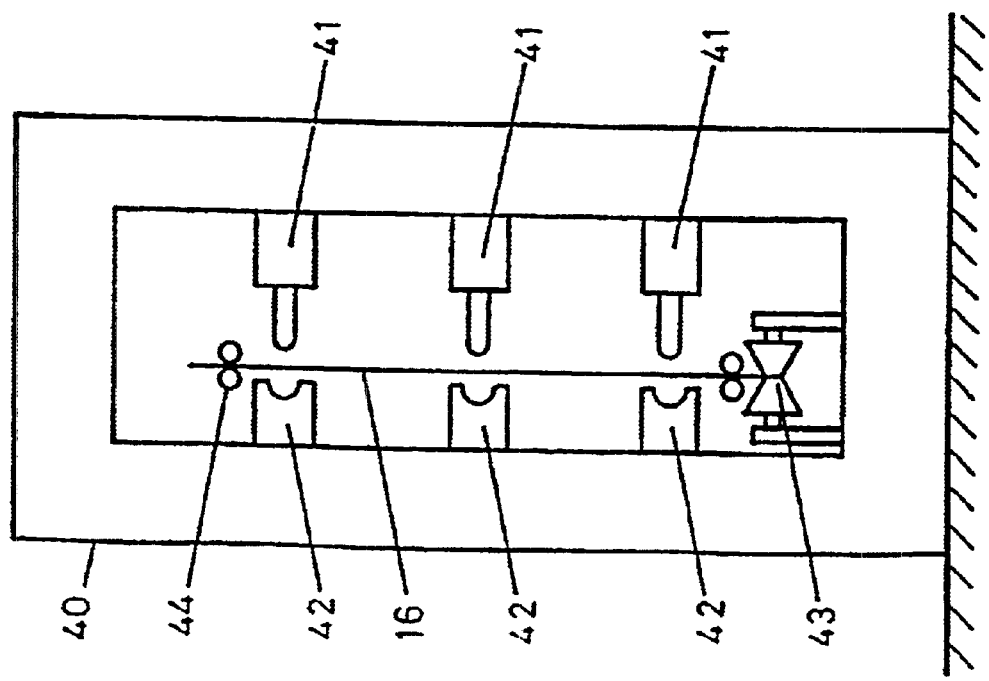

METHOD AND DEVICE FOR PRODUCING WELDED BLANKS

BACKGROUND OF THE INVENTION

The invention relates to a method for the manufacture of welded composite panels from at least two sheet-metal pieces. The invention also relates to an apparatus for the manufacture of welded composite panels from at least two sheet-metal pieces.

It is known to join sheet-metal pieces together by welding, particularly by laser welding, to form larger sheet-metal panels known as "tailored blanks" (Platinen). These composite panels, usually formed from sheet-metal pieces of different thicknesses and/or material properties, are then shaped e.g. into formed components for the motor vehicle industry which have locally dissimilar properties adapted to their loading. Examples of such formed components are side members contributing to the crumple zone in the VW Golf, or the side wall of the Chrysler Cherokee. However, the invention is not limited to the manufacture of tailored blanks for the motor vehicle industry.

EP 532835 discloses a welding machine for the manufacture of tailored blanks, hereinafter also called TB. The word "tailored" refers to the predefined shape of the individual sheet-metal parts, and also of course to that of the welded assembly, these shapes being optimized in terms of both geometry and alloy for the subsequent application (structural members in the crumple zone or side wall). As presented in that publication, two sheet-metal pieces with predetermined shapes are in each case welded together (though one of the sheet-metal pieces may of course itself consist of parts that have already been welded together). For a typical TB consisting originally of four sheetmetal parts A, B, C and D, three welding operations are necessary. For example, two welding machines might be set up side by side to join the parts A and B to form the part AB, and the parts C and D to form the part CD, these parts AB and CD then being welded together by a third machine to form the TB. Handling between welding machines is usually performed by robots. Even with a crowded-together and optimized construction, such a welding installation can easily occupy a machine shop measuring 35×22 m (the individual welding machine can be 4×6 m); see also EP A 743129 or EP 522811, in particular the layout in FIG. 6, regarding the loading of an individual welding machine; and for a level of production such as exists in the motor vehicle industry, there may be a need for two or three installations running in parallel. Depending on production in the motor vehicle factory, these installations could be operating on a three-shift system. Special logistical requirements then arise, be they in the feed of individual sheets to the installation, manipulation within the installation, or onward transport of completed TBs from the installation. Firstly, problems are caused by the dimensions of the metal sheets which may run to several meters, the tonnages of the stacks of sheets, and the vulnerability of the sheet edges to be worked on. Secondly, storage is usually impossible or highly undesirable, as the just-in-time principle has to be observed and the quantities to be stored for production of up to several thousand vehicles per day (e.g. VW Golf III and IV) are so large as to be logistically difficult and therefore cost-intensive. Simplifying the logistics, in both small and large installations, is a constant concern. For want of alternatives, efforts are being concentrated on precise production planning and on optimizing the layout of the installations and the production facilities as a whole.

In the present state of the art, the welding of pieces to make a composite panel is performed in the flat horizontal (downhand) position, on corresponding welding installations constructed for holding the pieces, as shown highly schematically in FIG. 1 by way of example. The laser beam 2 of the installation 1 which acts on the joint line of the pieces 5, 5' from above is produced by a laser 3, and impinges on the horizontal pieces which are held in the welding position on a holding device 7 magnetically or pneumatically and also, if need be, mechanically, and are usually traversed under the laser in the direction at right angles to that of the laser itself which is traversable in one direction only.

The remainder of the known processing steps (stamping of beads, possibly cutting) and also conveying and (interim) storage are performed with the pieces or panel in the horizontal position.

Handling of the horizontally-held composite panels, which in some cases may have large dimensions, e.g. 200×200 cm or larger, requires a considerable amount of room, and the composite panel is generally accessible only from above.

The fundamental task of the invention is to provide a method and an apparatus of the kind stated at the outset which do not have these drawbacks and which improve the construction and operation, respectively, of the installation.

SUMMARY OF THE INVENTION

The present invention resides in the method of manufacture of laser-welded composite panels from at least two sheet metal pieces. The pieces have at least one processing step in which the pieces or composite panels are first placed in an essentially upright position and then held in that position for further processing.

In a further aspect of the invention, the invention comprises an apparatus for the manufacture of composite panels from at least two sheet-metal pieces. The apparatus for processing the pieces has an essentially upright configuration and includes a holding device for the sheet metal pieces that stands upright or is tilted into an upright position. The apparatus further comprises a welding plant that is configured to generate a laser welding beam emitted essentially horizontally with respect to the floor area of the holding device and welding plant.

Working with the composite panels or pieces in the upright position results in a large saving of space (the room required in the vertical direction is usually available anyway), and better access to the composite panels.

Preferably, as processing step, welding is performed with the pieces or panel in the upright position.

BRIEF DESCRIPTION OF THE DRAWINGS

Examples of ways of carrying out the invention will now be described in detail with reference to the drawings, in which:

FIG. 7 shows schematically welding in the upright position;

FIG. 8 shows schematically the unloading of the welding station;

FIG. 9 shows the stamping of beads in the upright position;

FIG. 10 is a view from above of the parting of a succession of upright composite panels;

DESCRIPTION OF THE INVENTION EMBODIMENTS

Figure 1:
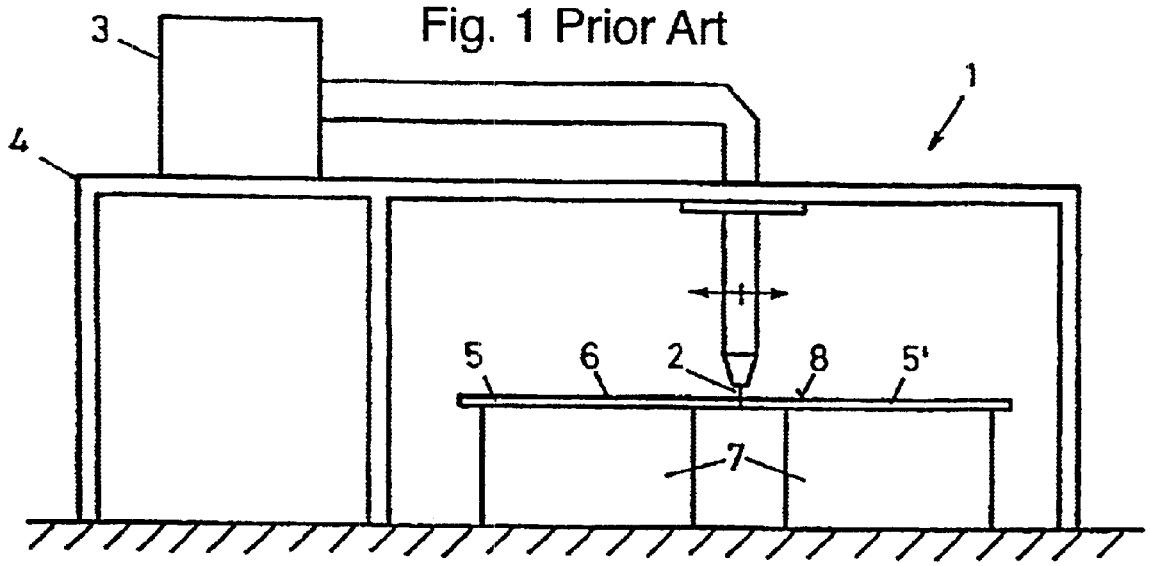
FIG. 1 shows schematically a composite panel welding apparatus according to the state of the art.

FIG. 1 shows the previously mentioned state-of-the-art apparatus in which the sheet-metal pieces 5 and 5' which are to be welded to form the composite panel 6 are laid horizontally on a holding device, such as two tables as shown in FIG. 1, and fixed in relation to each other. The laser beam 2 is directed from above on to the composite panel 6, the surface of which forms the welding plane 8. Here, the laser light source 3 is usually mounted on a laser stand 4. This apparatus takes up a large amount of room, and the accessibility of the underside of the composite panel 6 (e.g. for the weld inspection incorporated in the welding process), and also that of the laser source 3, is poor.

Figure 2:
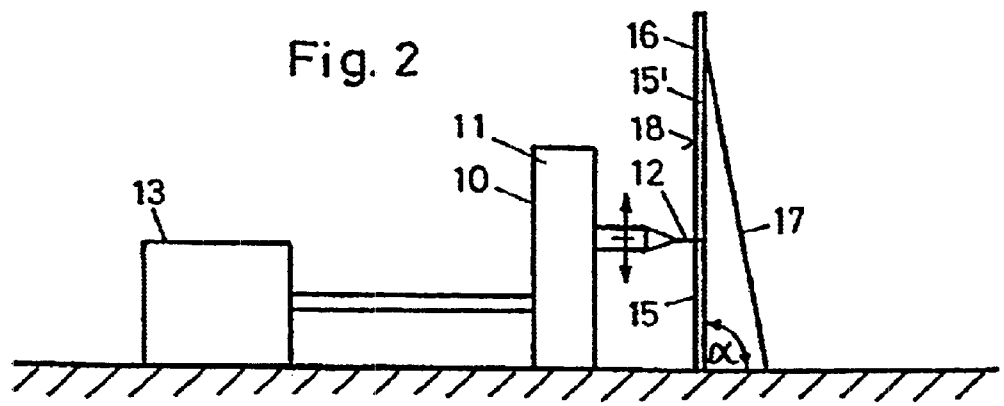
FIG. 2 shows schematically a welding apparatus according to the invention.

FIG. 2 shows, in a first, highly schematic, illustration, the procedure and apparatus according to the invention. The sheet-metal pieces 15, 15' for welding and/or the composite panel 16 are held in an upright position by a holding device 17. Here, an "upright position" means an orientation at an angle a to the horizontal that is essentially vertical. However, other angular orientations to the horizontal, including for example an angle of only 45°, are understood as "upright" for present purposes. The occasions on which advantages are to be gained by such an oblique positioning are, of course, limited; the essentially vertical position is preferred. For example, it is nowadays possible to precisely locate the individual sheets in the welding position with sufficient reliability, albeit at corresponding expense (see e.g. EP 583999, EP 626230 or EP 565846). For suitably shaped sheets, a gravity-aided self-centering effect can be exploited in the loading of the upright holding device 17, and the necessary positioning of the panels in the tenths or hundredths of a millimeter range can be facilitated, or undertaken with greater certainty. Inclined edges of adjacent sheets slip down over each other until the final position induced by gravity is reached with or without assistance (but no longer assisted by a device as is necessary when the sheets are arranged horizontally). In the apparatus shown in FIG. 2 the laser source 13 may stand on the floor or on a stable pedestal. This dispenses with the entire laser stand, thereby also reducing the risk of vibrations and/or relative movements between laser source 13 and laser optics. (Extended tubes for guiding the laser beam are particularly troublesome in this regard.) There is better access to the laser for installation and maintenance work. The laser beam 12 extends in the horizontal direction, and impinges on the pieces 15 and 15' essentially perpendicularly to the welding plane 18. A motion control device 11 moves the laser beam 12 in accordance with the seam to be welded. One possible arrangement, indicated by the arrows, is for the laser to move in the vertical direction only, and the workpiece 16 to be taken past the laser with the holding device 17. It is immediately apparent that the shop floor area which the apparatus requires can be significantly reduced by this step of placing the panel upright, which also results in a simpler design for the individual welding machine. In the vertical direction, on the other hand, space is usually already available for the upright composite panels 16 to be worked on and manipulated with suitable holding and carrying devices.

Figure 3:
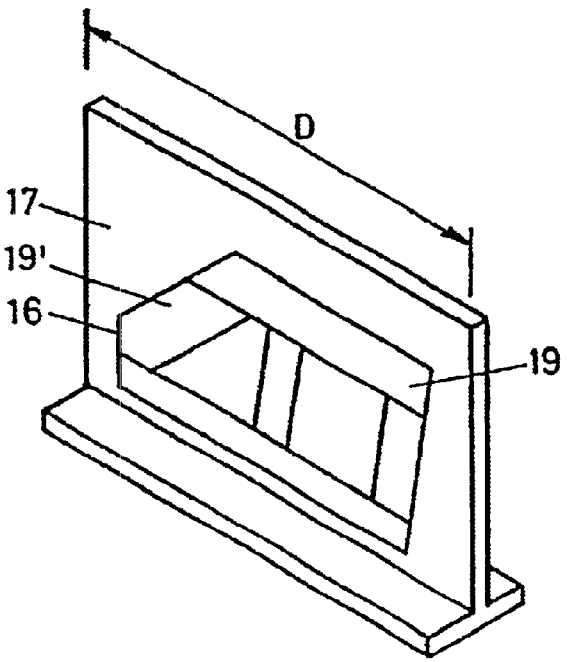
FIG. 3 shows schematically the loading of a welding station.
Figure 4:
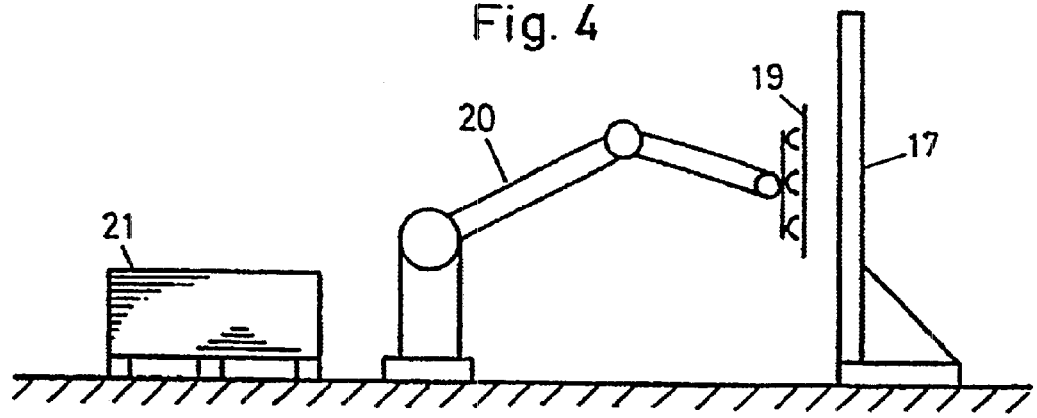
FIG. 4 shows a first alternative way of loading a welding station.

FIG. 3 shows a holding device 17 with sheet-metal pieces arranged thereon, of which only two (19 and 19') carry reference numbers, and which together form the composite panel 16. The length D of the holding device 17 can be anything up to several meters; indeed it is then that the vertical welding station takes up a distinctly smaller amount of room and affords ideal access to both the panel clamping side and the back of the holding device 17. As, in the state of the art, large-area composite panels are generally held with magnets, with additional mechanical and/or pneumatic clamping if the need arises, similar methods can be used to fix the sheet-metal pieces vertically. If need be, traversable mechanical holding devices which can be connected to the panel bearing plane can additionally be used. FIG. 4 shows a holding device 17, which is for example a magnetic holding device, being loaded by means of a robot 20. The robot 20 picks up the individual sheet-metal pieces 19 from one or more stacks 21 and places them on the holding device 17 in the desired arrangement. As already stated, this device may have, in addition to magnetic holding means, mechanical holding means or simply mechanical stops to define the position of the pieces 19 in the vertical or horizontal direction. After the holding device 17 has been loaded with a set of sheet-metal pieces to form the composite panel, the holding device is moved to the welding station with the laser.

Figure 5:
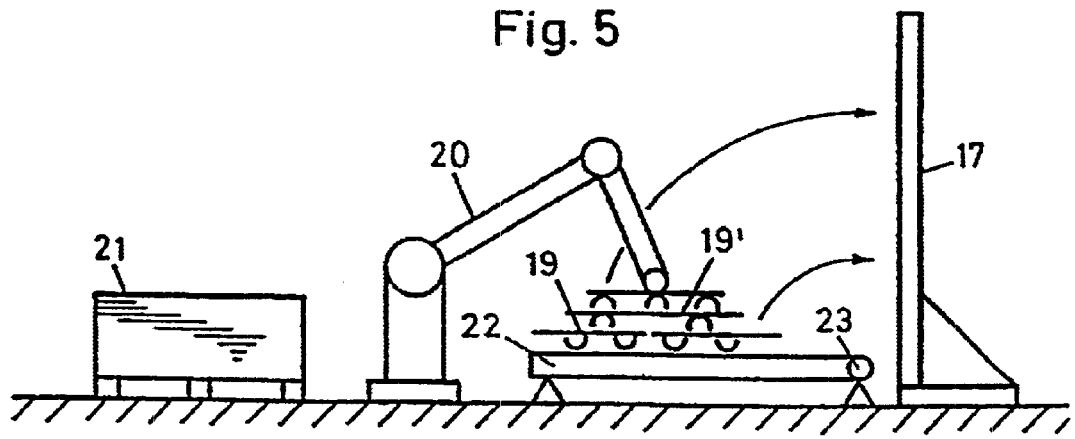
FIG. 5 shows another alternative way of loading a welding station.

FIG. 5 shows an alternative way of loading the holding device 17 in which the sheets 19, 19' and any further sheets are first arranged on a loading table 22 in the horizontal position. After loading, the loading table is tilted upwards about the axis 23 to bring the sheet-metal pieces into contact with the holding device 17 to which the pieces are magnetically transferred and on which they are magnetically held fast. Instead of tilting the loading table 22, the holding device 17 could of course be tilted downwards to the loading table, and then tilted up again to an upright position.

Figure 6:
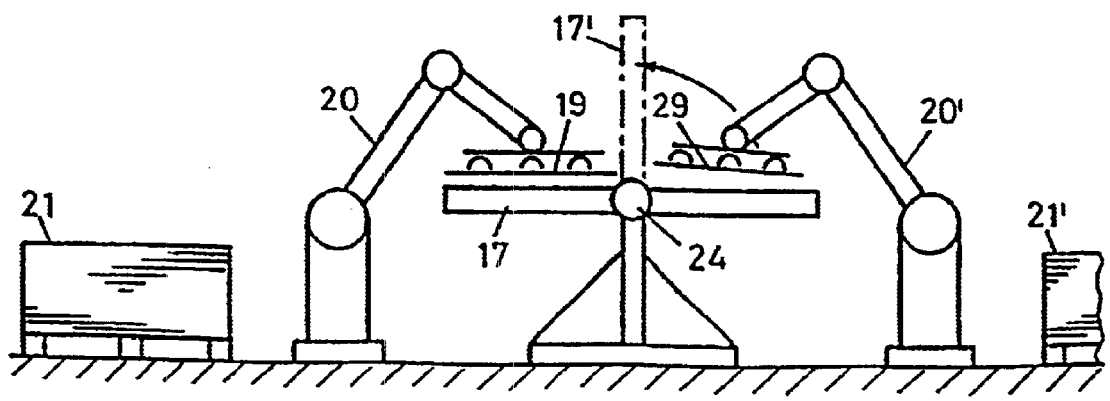
FIG. 6 shows yet another alternative way of loading a welding station.

FIG. 6 shows another arrangement, in which the holding device 17 is tiltable about an axis 24 into a horizontal position, and in this position can be loaded by one or, as shown, two robots 20, 20 ' with sheets 19 and 29 from two stacks 21, 21'. After loading, the holding device is tilted into its welding position 17' shown by chain-dotted lines. Of course, loading in the variants shown could also be carried out by hand or by other means than by robots 20.

FIG. 7 shows welding with a laser beam from a laser source 13 which can be traversed in the vertical (X) direction by the motion control 11. The sheet-metal pieces 19 and 19' are on the holding device 17 which can be taken past the welding beam in the horizontal (Y) direction by means of a carriage 30. With this arrangement, both straight and curved welded seams can be produced without any problems.

FIG. 8 shows highly schematically the unloading of the welded composite panel 16. The welded composite panel exits from the welding station in an upright position. It is handled and/or transported e.g. on live narrow belt conveyors 32 or roller conveyors. To guide the composite panel vertically, idle or live guide rollers or guide belts 33, 34 placed on either side of the panel are all that is required.

Transfer of the composite panel from the holding device 17 to the conveying means can be effected by robot, or by belts or rollers brought near the holding device 17. Here also it can be seen that conveying the composite panel in an upright position takes up considerably less space, and also provides better accessibility from both sides, than conventional horizontal handling.

To facilitate the stacking of the composite panels, it is known to stamp beads into them so that composite panels consisting of sheets of different thicknesses can be stacked evenly. The stamping of beads can also be a processing step performed with the composite panel 16 in the upright position, as shown schematically in FIG. 9. Here, the composite panel is conveyed through the bead stamping device 40 by conveyor means 43, and if necessary can be held by guide means 44. The beads are stamped by suitable male and female dies 41 and 42, now working horizontally instead of vertically.

FIG. 10 shows the separation and stacking of the composite panels 16, which are being conveyed in the upright position in the conveyor means already described.

Switches 45 with points 46 steer the composite panels on to different tracks from which they can be tipped and/or piled in stacks 47 and 48 on the side required, by means of simple handling devices. Similarly, scrap panels can be rejected by the use of such switches.

Figure 11:
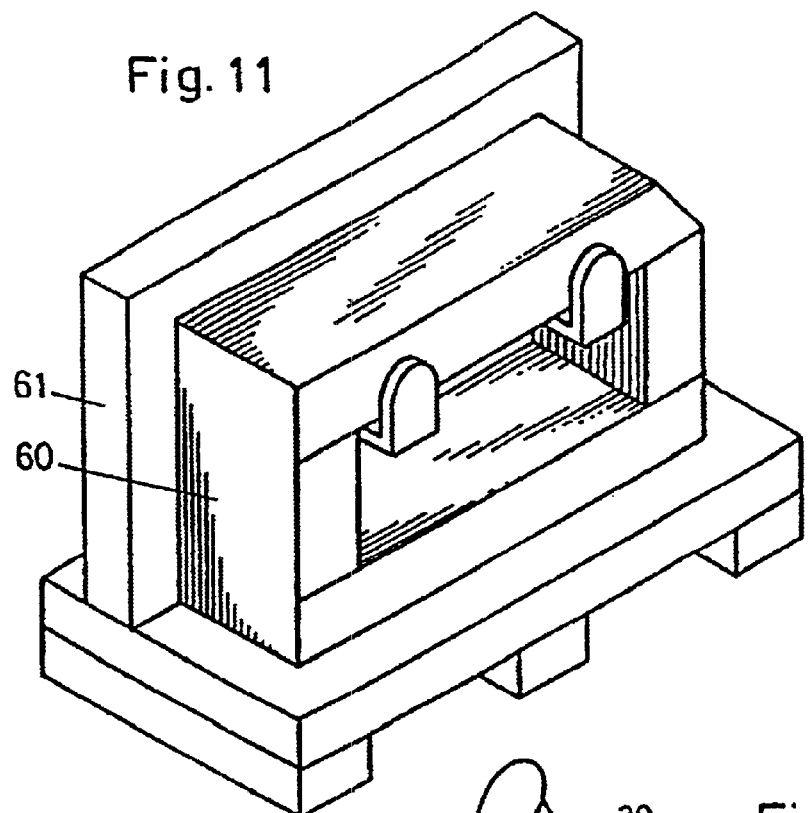
FIG. 11 shows the storage of composite panels in the upright position.

FIG. 11 shows the interim storage of completed composite panels in the vertical position. Instead of being stacked in the horizontal position as hitherto, they are now preferably hung in the vertical position in suitable transport cradles. These cradles 61 allow compact interim storage without the use of horizontal stillages which take up a lot of room, and/or they allow space-saving transportation. In this case, special devices for handling the stack 60 are no longer required, and it may also be possible to dispense with stacking beads, since the composite panels are no longer lying on top of one another in the stack 60. Processing and handling the composite panels in an upright and essentially vertical (though possibly leaning) position as described affords much better access to the welded composite panels for visual inspections, both in the region of the welding holding fixture and in the region of the conveyor paths, than can be obtained if the panels are horizontal. A visual inspection station can easily be provided in the region of the conveyor path.

Figure 12:
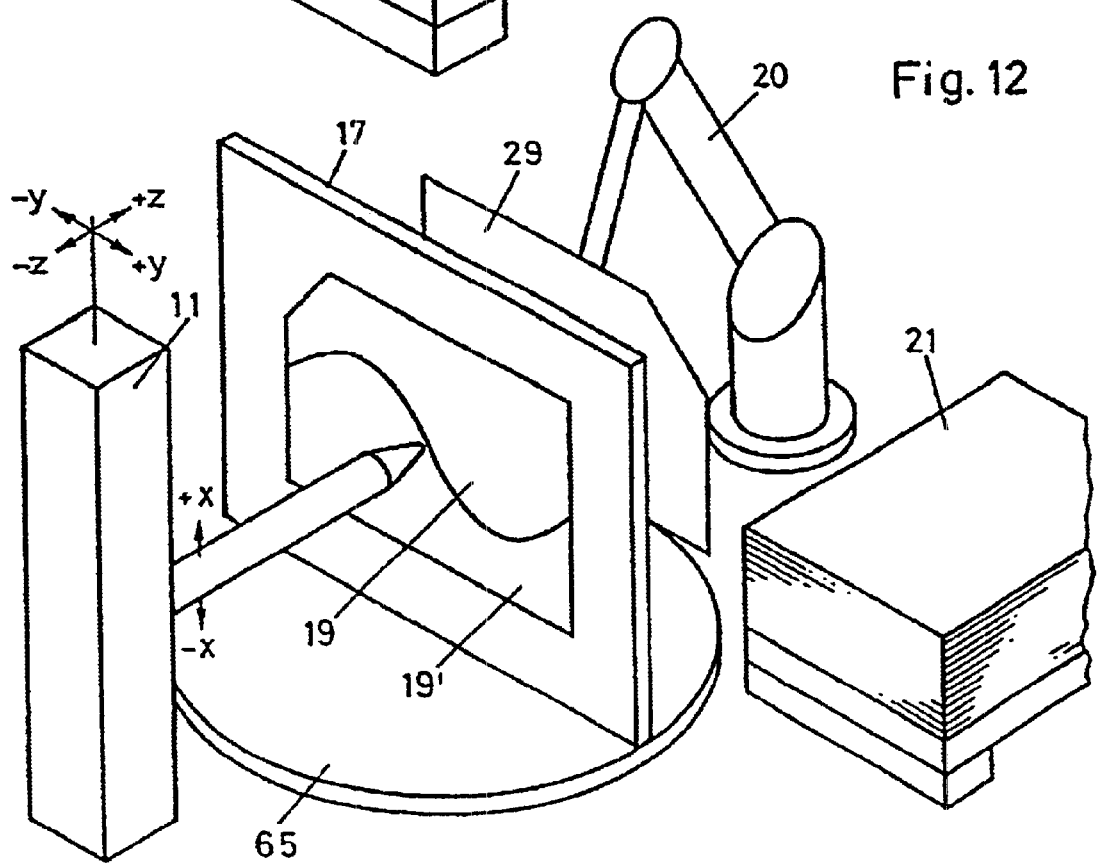
FIG. 12 shows an alternative way of carrying out the welding and of loading the welding station.

FIG. 12 shows a variant with a double-sided holding device 17. In this variant, the sheet-metal pieces 19 and 19' held on one side of the device 17 are welded by means of the welding device 1 V, which allows the laser to be controlled in both X and Y directions, while on the other side of the holding device 17 sheet-metal pieces from a stack 21 are attached to the holding device by a loading device, in particular a robot 20. Upon completion of welding and loading, the holding device 17 is turned about a horizontal axis or a vertical axis. In the Figure, a turntable 65 is shown. The welded composite panel can then be unloaded by the robot and the vacant area of the holding fixture refilled, as welding is resumed on the opposite side.

Instead of the welding process alluded to in the foregoing description, it is of course possible to carry out some other processing step, such as has been described in relation to the impressing of beads; in particular, a laser cutting operation can also be performed with the composite panel standing upright, or a cutting operation can be performed on individual sheet-metal pieces with the sheet-metal pieces standing upright.

What is claimed is:

1. Method for the manufacture of laser-welded tailored blanks from at least two sheet metal pieces, comprising the steps of:
    placing the at least two sheet metal pieces in a common plane in a generally upright position to weld facing edges of the at least two sheet metal pieces to form a composite panel; and
    processing the at least two sheet metal pieces while in the generally upright position, whereby the welding plane is generally vertical.

2. Method according to claim 1, wherein the processing step includes welding the pieces to form the composite panel while the pieces are in the generally upright position.

3. Method according to claim 1, wherein the processing step includes forming beads in the composite panel while the panel is in the generally upright position.

4. Method according to claim 1, wherein the processing step includes cutting the pieces or the composite panel while the pieces or panel are in the generally upright position.

5. Method according to claim 1, wherein the processing step includes conveying pieces or composite panels while the pieces or panels are in the generally upright position.

6. Method according to claim 5, wherein the processing step includes parting a succession of composite panels while the panels are in the generally upright position.

7. Method according to claim 5, wherein the processing step includes storing the composite panels in the generally upright position.

8. Method according to claim 1, wherein the processing step includes loading the pieces in the generally upright position onto a holding device of a processing station.

9. Method according to claim 8, wherein a welding station includes a holding device such that loading can proceed on one side thereof while welding proceeds on the other side thereof, and wherein the step of processing includes rotating the welding station upon completion of welding the composite panel.

10. Method according to claim 1, wherein the processing step includes:
    loading the pieces in a generally horizontal position onto a loading table;
    orienting the pieces into a generally upright position; and
    placing the pieces in the generally upright position onto a holding device.

11. Method according to claim 1, wherein the processing step includes:
    tilting a holding device into a generally horizontal position;
    loading the pieces horizontally onto the holding device; and
    tilting the holding device into the generally upright position.

12. Method according to claim 1, wherein the processing step includes positioning the pieces in a holding device by being assisted to slip under the pieces own weight to a predetermined final position.

13. Method according to claim 1, wherein the dimensions or profiles of the pieces or the arrangement of the pieces in a holding device are predetermined so that when in the holding device in a generally upright position the pieces are self-centering or are assisted to find an intended final position under the pieces own weight.

14. Apparatus for the manufacture of tailored blanks from at least two sheet metal pieces, comprising:
    a holding device for the at least two sheet metal pieces, the holding device being configured for operating in a generally upright position or being tiltable into a generally upright position for holding the at least two sheet metal pieces in a common plane in a generally upright position to weld facing edges of the at least two sheet metal pieces to form a composite panel; and a welding plant configured to generate a laser welding beam emitted generally horizontally with respect to the floor area of the holding device and the welding plant.

15. Apparatus according to claim 14, further comprising a conveyor for moving composite panels while in a generally upright position.

16. Apparatus according to claim 14, further comprising at least one loading device for feeding pieces while in a generally upright position to the holding device.

17. Method for the manufacture of laser-welded tailored blanks from, at least two sheet metal pieces, comprising the steps of:

placing the at least two sheet metal pieces in a common plane in a generally upright position to weld facing edges of the at least two sheet metal pieces to form a composite panel;

welding the at least two sheet metal pieces while in the generally upright position, whereby the welding plane is generally vertical; and oiling the composite panel while in the generally upright position.

18. Method for the manufacture of laser-welded tailored blanks from at least two sheet metal pieces, comprising the steps of:

placing the at least two sheet metal pieces in a common plane in a generally upright position to weld facing edges of the at least two sheet metal pieces to form a composite panel;

welding the at least two sheet metal pieces while in the generally upright position, whereby the welding plane is generally vertical;

oiling the composite panel while in the generally upright position; and maintaining and storing the composite panel in the generally upright position.

19. Method for the manufacture of laser-welded tailored blanks from at least two sheet metal pieces, comprising the steps of:

placing the at least two sheet metal pieces in a common plane in a generally upright position to weld facing edges of the at least two sheet metal pieces to form a composite panel;

slipping the pieces by assistance of gravity to self-center and abut edges of the pieces; and processing the pieces while in the generally upright position.

* * * * *